United States Patent [19]

Huriau

[11] 4,426,711

[45] Jan. 17, 1984

[54] PROCESS FOR THE TRANSMISSION OF SERVICE SIGNALS FOR A DIGITAL RADIO BEAM, AS WELL AS TRANSMITTER AND RECEIVER FOR USING SUCH A PROCESS

[75] Inventor: Alain Huriau, Paris, France

[73] Assignee: Thomson-CSF, Paris, France

[21] Appl. No.: 318,797

[22] Filed: Nov. 6, 1981

[30] Foreign Application Priority Data

Nov. 21, 1980 [FR] France ................................ 80 24802

[51] Int. Cl.³ ............................................. H04B 1/66
[52] U.S. Cl. .................................. 375/17; 370/110.4; 375/122; 381/34
[58] Field of Search .................... 375/30, 31, 28, 29, 375/17; 358/133, 260, 261, 262; 179/15.55 R; 371/67; 370/101.1, 101.4

[56] References Cited

U.S. PATENT DOCUMENTS

| | | | |
|---|---|---|---|
| 3,603,725 | 9/1971 | Cutler | 179/15.55 R |
| 3,609,244 | 9/1971 | Mounts | 179/15.55 R |
| 3,624,306 | 11/1971 | Myers | 179/15.55 R |
| 3,720,786 | 3/1973 | Cutler | 179/15.55 R |
| 4,259,693 | 6/1976 | Aaron et al. | 358/261 |

OTHER PUBLICATIONS

Kortman, "Redundancy Reduction-A Practical Method of Data Compression", IEEE Proceeding, vol. 55, No. 3, Mar. 1967, pp. 253-262.

Primary Examiner—Benedict V. Safourek
Assistant Examiner—Stephen Chin
Attorney, Agent, or Firm—Cushman, Darby & Cushman

[57] ABSTRACT

To transmit the service signals of a digital radio beam, the carrier is modulated in accordance with a supplementary state in a special modulator when two successive data words are identical. On reception a special demodulator detects the transmission of a service bit having a value 1. The transmission of a service bit having a value 0 takes place by the detection in a comparator of two successive identical data words simultaneously with the detection of the non-transmission of the supplementary state. This supplementary modulation state advantageously corresponds to the elimination of the carrier.

7 Claims, 3 Drawing Figures

4,426,711

PROCESS FOR THE TRANSMISSION OF SERVICE SIGNALS FOR A DIGITAL RADIO BEAM, AS WELL AS TRANSMITTER AND RECEIVER FOR USING SUCH A PROCESS

BACKGROUND OF THE INVENTION

The present invention relates to processes for transmitting service signals of a digital radio beam. It also relates to the transmitters and receivers enabling the use of such a process in radio beams.

In order to use a radio beam it is necessary to transmit on the latter not only the signals such as speech signals for which it is intended, but also a certain number of supplementary signals, such as remote monitoring or service channels. These supplementary signals are called service signals.

When the modulation transmitted by the radio beams is of an analog nature, these service signals are usually in the form of analog tones.

In digital radio beams in which the carrier is directly modulated according to a certain number of states selected in a digital manner on the basis of digital input signals and able to represent both data and speech, it is both simpler and more advantageous to use these service signals in the form of digital signals.

To transmit these service signals, it is firstly possible to multiplex them with the main signal to be transmitted and then transmit the thus obtained frame, demultiplexing it on reception to separate the thus transmitted service signals. However, this has the disadvantage of increasing the power of the radio beam and the need to use a multiplexer and a demultiplexer on reception, which are costly and large pieces of equipment.

It is also known to transmit these service signals without increasing the power by superimposing an analog modulation, which can be of phase, frequency or amplitude, on the main modulation provided by the train of digital signals. In order that such a modulation superimposition does not disturb the main transmission, it is necessary to bring about a limitation to a relatively low service signal capacity.

BRIEF SUMMARY OF THE INVENTION

In order to transmit these signals with a relatively high power without excessively modifying the transmission spectrum and without using too much equipment, the invention proposes a process for the transmission of service signals of a digital radio beam, of the type consisting of transmitting data words of m bits (m being an integer exceeding 1) by modulating a carrier according to $n = 2^m$ states, wherein the service signals are transmitted bit by bit by means of an n plus first state of the carrier which is transmitted in place of the state corresponding to a data word when the latter is identical to that preceding it.

BRIEF SUMMARY OF THE DRAWINGS

The invention is described in greater detail hereinafter relative to non-limitative embodiments and the attached drawings, wherein show.

DETAILED DESCRIPTION OF THE INVENTION

In a digital radio beam, the signal to be transmitted is in the form of a series of digital words, each formed by m bits. These words are used for selecting the states of the carrier on transmission in the circuits of the radio beam transmitter. There are $n = 2^m$ such states. Thus, for words of three bits, it is possible to have a carrier with eight phase states spaced by 45°.

When the signal to be transmitted is formed by a series of words of the same value, the phase of the carrier remains constant. It can then be considered that in this case the transmission channel is inactive because the same information is repeated.

According to the invention at these times the service signals are transmitted by using a supplementary state of the carrier and coding such that there is a prediction of the repetition of the word of the main signal. Under these conditions the line power is not increased because it merely involves replacing a main bit by an auxiliary bit. However, the number of significant states of the carrier is increased by one unit.

The transmission quality of the service signals does not necessarily have to be as good as that of the main signals. Therefore the supplementary state of the carrier can be chosen so as to modify very slightly the characteristics of the transmitted signal and to facilitate both the modulation and the demodulation at the expense of a slightly reduced transmission reliability with respect to the service signals.

All modulation systems amount to the regular distribution in the phase plane of points representing the states of the carrier. Thus, in a purely phase modulation these representative points are regularly distributed over a circle centred on the origin of the axes and in the case of a modulation by states, corresponding to the superimposing of an amplitude modulation and a phase modulation, they are distributed over a square-mesh grid, which is itself centred on the origin of the axes. In all these cases no use is generally made of the zero state, which corresponds to the origin of the axes, because the latter corresponds to an elimination of the carrier increasing the incidence of parasitic signals and therefore the risks of incorrect decoding.

A good solution for the choice of the supplementary state for the transmission of service signals consists of using the zero state, which is the most sensitive to interference, but interferes only very slightly with transmission.

Figure 1:
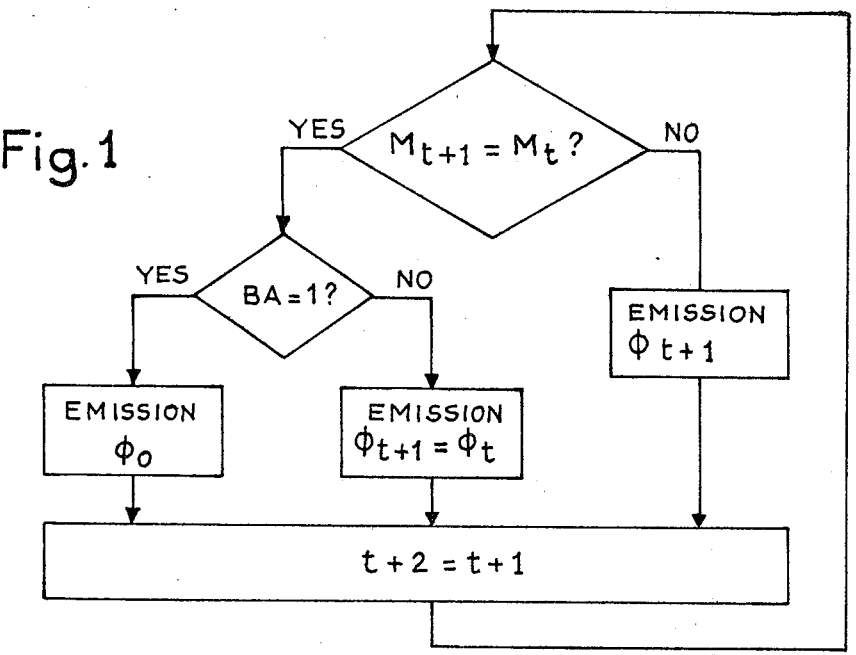
FIG. 1 a flow chart of the transmission of the signals.

Thus, if a word to be transmitted $M_{t+1}$ is identical to the word $M_t$ corresponding to the preceding significant time, the state of the carrier to be transmitted is normally $\emptyset_{t+1} = \emptyset_t$. In order to be able to transmit during this significant time $t+1$ the bit value of the service signal, a code will be chosen consisting, for example, of transmitting the state $\emptyset_0$ of the carrier if said bit has the value 1 and the state $\emptyset_t$ if said bit has the value 0. This coding process is represented by the flow chart of FIG. 1.

In this flow chart a start is made with a test stage on the value of the word $M_{t+1}$. If this word is not equal to $M_t$, this is followed by a carrier transmission stage with phase $\emptyset_{t+1}$. The sequence is terminated by the passage to the following significant time where $t+2 = t+1$, followed by the return to the starting stage.

If, however, $M_{t+1}$ is equal to $M_t$, this is followed by a second test sequence on the value of the service bit BA. If BA is equal to 1, this is followed by a carrier transmission stage with phase $\phi_0$, then the final stage. If BA is not equal to 1 there is a carrier transmission stage with phase $\phi_{t+1}$, which is in this case equal to the phase $\phi_t$ and then on to the final stage.

Figure 2:
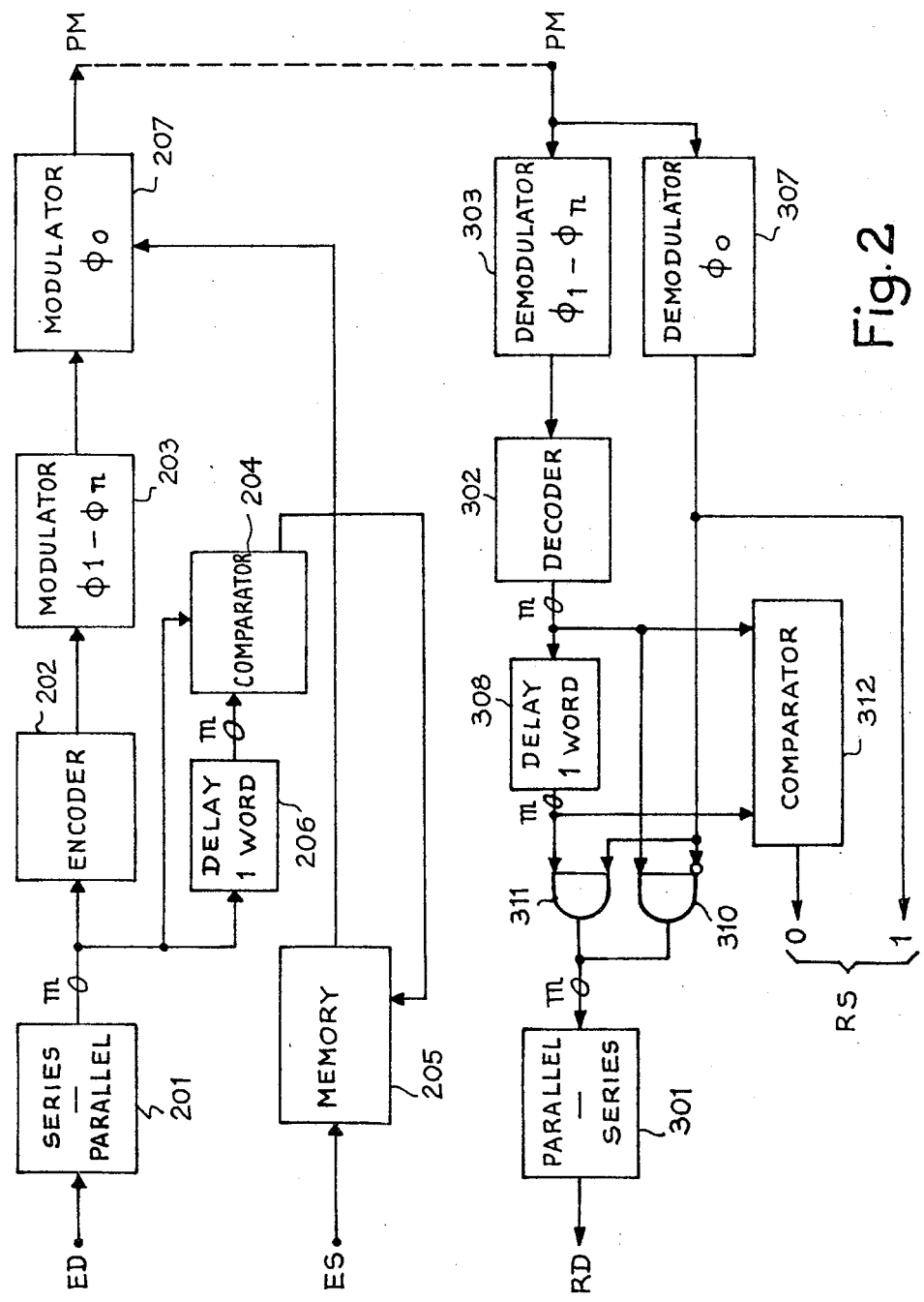
FIG. 2 the diagram of a radio beam transmitter/receiver.

The diagram of the transmitter making it possible to use this method is shown in the upper part of FIG. 2.

The digital data to be transmitted are in the form of a series binary signal ED, which is applied to a series-parallel converter 201 making it possible to obtain at its output words $M_t$ formed by m bits. These words are firstly applied to a differential coder 202 making it possible to supply the control signals from a modulator 203. Under the control of these signals the modulator supplies a carrier modulated in phase in accordance with a group of n separate phase states $\phi_1$ to $\phi_n$, n being equal to $2^m$.

The words M at the output of converter 201 are also applied to comparison means, which compare each word $M_{t+1}$ with the preceding word $M_t$. These comparison means comprise, for example, a delay circuit 206 which delays each word by a time equal to a significant interval, and a comparator 204 which receives the thus delayed word coming directly from converter 201. If these words are equal, comparator 204 supplies a logic 1 at its output. The binary service signal ES is applied to a memory 205 known as a FIFO making it possible to store the bits of this signal between the times when it is not possible to transmit them because signal ED does not permit it.

The logic 1 at the output of comparator 204 is applied to memory 205. It then releases a bit from the latter when signal ED permits transmission.

The output of this memory is connected to the modulation input of a second modulator 207, which also receives the modulated carrier from modulator 203. This modulator makes it possible to modulate this carrier by phase $\phi_0$ if the bit at the output of memory 205 is a logic 1. In this case the transmission of the carrier is purely and simply interrupted. Thus, this modulator functions like a simple switch.

However, if this eb supplied by memory 205 is a logic zero, the carrier from modulator 203 is purely and simply transmitted. Thus, carrier PM is obtained, which is transmitted to the receiver.

Figure 3:
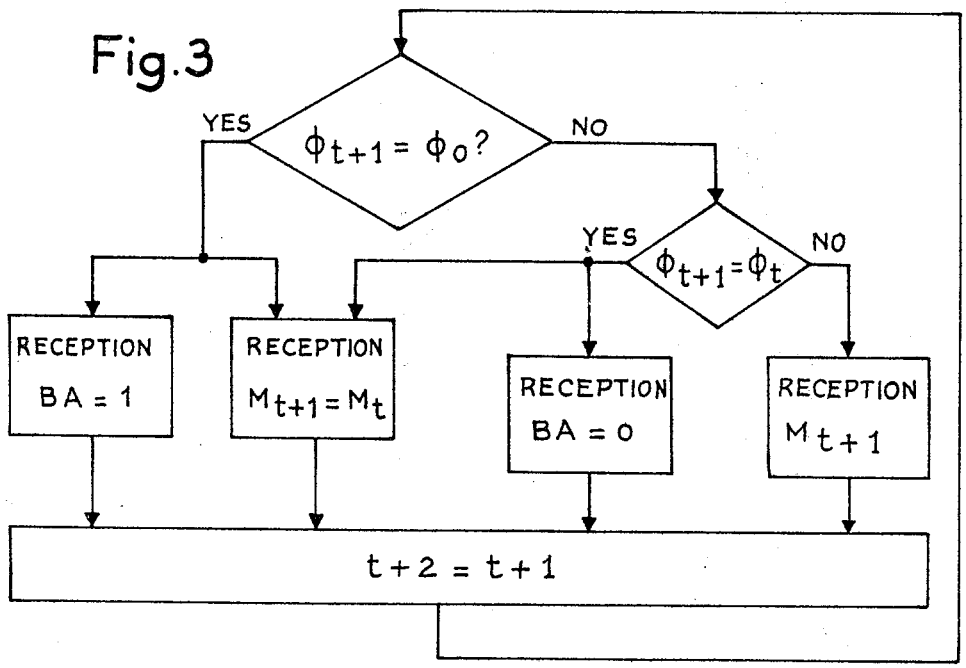
FIG. 3 a flow chart of the reception of the signals.

The decoding of the signals on reception takes place in accordance with the flow chart shown in FIG. 3.

This is started with a first test stage consisting of checking whether the signal phase received at time t+1, i.e. $\phi_{t+1}$ is equal to $\phi_0$. If this is the case there is a continuation with two simultaneous stages in which on the one hand the reception of an auxiliary bit BA which is equal to 1 is validated and on the other the reception of a word $M_{t+1}$ equal to $M_t$ is validated. Following these two simultaneous stages there is a continuation on to a final stage where the following significant time t+2 becomes time t+1, making it possible to recommence with the start of the flow chart. If $\phi_{t+1}$ is not equal to $\phi_0$ there is then a continuation with a second test stage when it is established whether $\phi_{t+1}$ is equal to $\phi_t$. If this is the case there are then two simultaneous stages, whereof one corresponds to the reception of a word $M_{t+1}$ which is equal to the preceding word $M_t$. This stage is common to one stage of the preceding branch. The other stage corresponds to the reception of an auxiliary bit BA, which is equal to 0.

If $\phi_{t+1}$ differs from $\phi_t$ there is a continuation with a single stage corresponding to the reception of a word $M_{t+1}$ determined by the phase $\phi_{t+1}$. In both cases the final stage follows, making it possible to recommence the sequence.

The radio beam receiver making it possible to receive this modulation is shown in the lower part of FIG. 2. The modulated carrier PM transmitted by the receiver is received in the receiver on two demodulators.

A first standard demodulator 303 makes it possible to supply a signal, which can assume eight states as a function of whether the phase of the carrier received has one of the eight phases 1 to n. This signal is transmitted to a decoder 302 which reconstitutes words of m bits in parallel. These words are directly transmitted by a multiple AND gate 310, if state $\phi_0$ has not been received.

The words at the output of decoder 302 are also applied to a delay device 308, formed for example by a single-stage parallel register making it possible to delay them by a significant interval. Thus, the previously transmitted word is present at the output of delay device 308. If then the state $\phi_0$ has been transmitted, indicating that the transmitted word is the same as the preceding word, said delayed preceding word is transmitted via a second AND gate 311, whose output is in parallel with that of gate 310.

These two parallel outputs are then applied to a parallel-series converter 301 making it possible to supply the received data signal in series mode. This signal RD is then identical to the transmitted signal ED, with the exception of possible transmission errors.

The modulated carrier PM received is also applied to a demodulator 307 making it possible to detect the state $\phi_0$. As in the described embodiment this state is simply composed of an absence of the carrier a simple detector, equipped, for example, with a threshold circuit making it possible to determine the drop below a predetermined value of the level of the signal received, makes it possible to supply a logic signal indicating the appearance of said state $\phi_0$ in the signal received.

The signal at the output of the demodulator 307 is on the one hand applied to gate 310 on an inverting input making it possible to open the latter when state $\phi_0$ has not been received and close it in the reverse case.

It is also applied to a direct input of gate 311 which, in opposite manner to gate 310, makes it possible to keep it closed when state $\phi_0$ has not been received, but open it on detecting the presence of this state. As indicated hereinbefore this makes it possible to allow the passage of the direct word, when the latter is the same as the direct word and $\phi_0$ has been received.

To obtain the service/auxiliary digital signal the output of demodulator 307 is directly used for states 1, because the transmission of the state $\phi_0$ indicates the transmission of a service/auxiliary bit of value 1. However, when state $\phi_0$ is not transmitted, the absence of a signal at the output of the demodulator cannot be interpreted as the transmission of a service/auxiliary bit of value 0.

As shown hereinbefore the test of this transmission takes place on the transmission of two successive data words of the same value obtained by the successive transmission of two identical states chosen between $\phi_1$ and $\phi_n$.

To determine this the input and output of the delay device 308 are applied to a multiple comparator 312. Thus, if the words transmitted at two successive significant times are the same, the comparator will detect this identity and transmit at its output a bit which could, for example, be 0, it being understood that the rest state 1 of the comparator does not signify the transmission of a service bit 1.

Thus, to obtain the service bits, it is necessary to have at least two separate outputs, one for the 1 bits and the other for the 0 bits, because transmission does not take place on a permanent basis. The service circuits operating on the basis of these bits will interpret the signals present at these two outputs. It is thus possible to reconstitute a series binary trained formed by 1 and 0 for the service bits within the actual receiver, so that said bits are present at a single output. However, it would then be necessary to have another output with a validation signal for distinguishing the absence of the signal at the first output of the transmission of a 0 bit. Thus, there would still be two outputs.

Finally another solution could consist of storing the service bits received and then transmitting them in an asynchronous manner with a header in the case of a sufficient number thereof.

In order to know what is the maximum flow of available service bits it is necessary to assume a state when the data signal is of a random nature. This is in fact the general case because usually a jamming station is used on transmission and an antijamming station on reception in order to minimize the risk of error in accordance with the information theory and so as to have a sufficient number of transitions.

In this case starting with a main flow rate of 140 megabits per second and with an eight-phase modulator, probabilistic calculations shows that the auxiliary flow rate can reach 2.2 megabits per second.

However, this high rate cannot be used for the service bits, because they appear in a continuous manner, whereas the probability of transmission due to the presence of two identical consecutive words is of a random nature. In order not to lose too many words, it is possible to use for example an oversampling system, which consists of the mean retransmission of the same auxiliary bit several times.

Using the numerical example referred to hereinbefore, if it is desired to have an auxiliary flow rate of 300 kilobits per second, which represents a 7.3 times oversampling, the probability calculation shows that the risk of loss of an auxiliary bit and consequently the unlocking of auxiliary circuits will have a value of $10^{34}$, which is very low and perfectly acceptable.

I claim:

1. A process for the transmission of service signals of a digital radio beam, of the type consisting of transmitting data words of m bits (m being an integer exceeding 1) comprising the steps of;
    modulating a carrier according to $n=2^m$ states;
    transmitting the service signals bit by bit using an $n+1$ state of the carrier which is transmitted in place of the state corresponding to a data word when the latter is identical to that preceding it; and
    distinguishing between the two possible values of the service bit to be transmitted by using the $n+1$ state for coding one of its values and the state corresponding to the data word replaced by the service bit for coding the other value.

2. A process according to claim 1 wherein the $n+1$ state is a state corresponding to the non-transmission of the carrier.

3. A transmitter for transmitting the service signals of a digital radio beam comprising:
    series-parallel conversion means for receiving a series digital signal of data to be transmitted and for converting it into a sequence of words of m bits in parallel;
    a coder for processing a first control signal from said words;
    a first modulator for supplying a carrier modulated in accordance with $n=2^m$ states under the action of the first control signal;
    means for comparing each word with the preceding word and supplying a second control signal when these two words are identical;
    a FIFO-type memory for receiving a series digital service signal to be transmitted and supply it bit by bit under the action of the second control signal; and
    a second modulator for receiving the carrier modulated by the first modulator and for modulating it according to an $n+1$ state under the action of the bit supplied by the memory.

4. A transmitter according to claim 3, wherein the second modulator functions by eliminating the carrier when the bit supplied by the memory has a value 1.

5. A transmitter according to claim 4, wherein the first modulator is a phase modulator.

6. A receiver for receiving data and service signals of a digital radio transmission comprising:
    a first demodulator for receiving a carrier modulated according to $n+1(n=2^m)$ states and transmitting a first demodulation signal corresponding to the modulation of n of these states;
    a decoder for forming words of m bits in parallel from this first demodulation signal;
    series-parallel conversion means for receiving these words and converting them into a received data series digital signal;
    a second demodulator for receiving the modulated carrier and transmitting a second demodulation signal corresponding to the demodulation of the $n+1$ state;
    means for delaying each word transmitted by the decoder and supplying it synchronously with the following word;
    means for simultaneously receiving this delayed word and the following word and supplying the delayed word under the action of the second demodulation signal, or the following word when the second demodulation signal is absent; and
    means for comparing the delayed word and the following word and supplying a service bit received according to a predetermined state when these two words are identical, the second demodulation signal marking said service bit received in accordance with its other determined state.

7. A receiver according to claim 6, wherein the second demodulator comprises a threshold circuit detecting the disappearance of the modulated carrier.

* * * * *